United States Patent [19]

Iwatani

[11] Patent Number: 4,511,469
[45] Date of Patent: Apr. 16, 1985

[54] FILTER PRESS OF MOVABLE TWIN HEAD TYPE

[75] Inventor: Akitoshi Iwatani, Marugame, Japan

[73] Assignee: Ishigaki Kiko Co., Ltd., Tokyo, Japan

[21] Appl. No.: 444,675

[22] Filed: Nov. 26, 1982

[51] Int. Cl.³ .............................................. B01D 25/14
[52] U.S. Cl. .................................. 210/225; 210/230; 210/236; 100/198
[58] Field of Search ....................... 210/225, 230, 236; 100/198, 199

[56] References Cited

U.S. PATENT DOCUMENTS

| | | | |
|---|---|---|---|
| 3,807,567 | 4/1974 | Iwatani | 210/225 |
| 4,032,450 | 6/1977 | Iwatani | 210/230 |
| 4,364,827 | 12/1982 | Guttman | 210/225 |

FOREIGN PATENT DOCUMENTS 56-17132  4/1981  Japan .
56-33619  8/1981  Japan .
1429855   3/1976  United Kingdom ................ 210/225

Primary Examiner—David Sadowski

[57] ABSTRACT

This invention relates to a filter press in which between a pair of heads a plurality of filter plates are connected to one another by loose connecting means. In the improved apparatus, the heads are both movable so that the filter plates may be moved in sequence, simultaneously from both end sides, toward the center to close the intervals therebetween or away from the center to provide intervals therebetween, whereby the time required in assembling and separating the filter plates can be considerably reduced. When the filter plates in assembled state, if one of the heads is pressed, while the other head is placed under action of stoppers, the filter plates are vigorously tightened by a cylinder having a shorter stroke than that in the prior-art apparatus.

10 Claims, 15 Drawing Figures

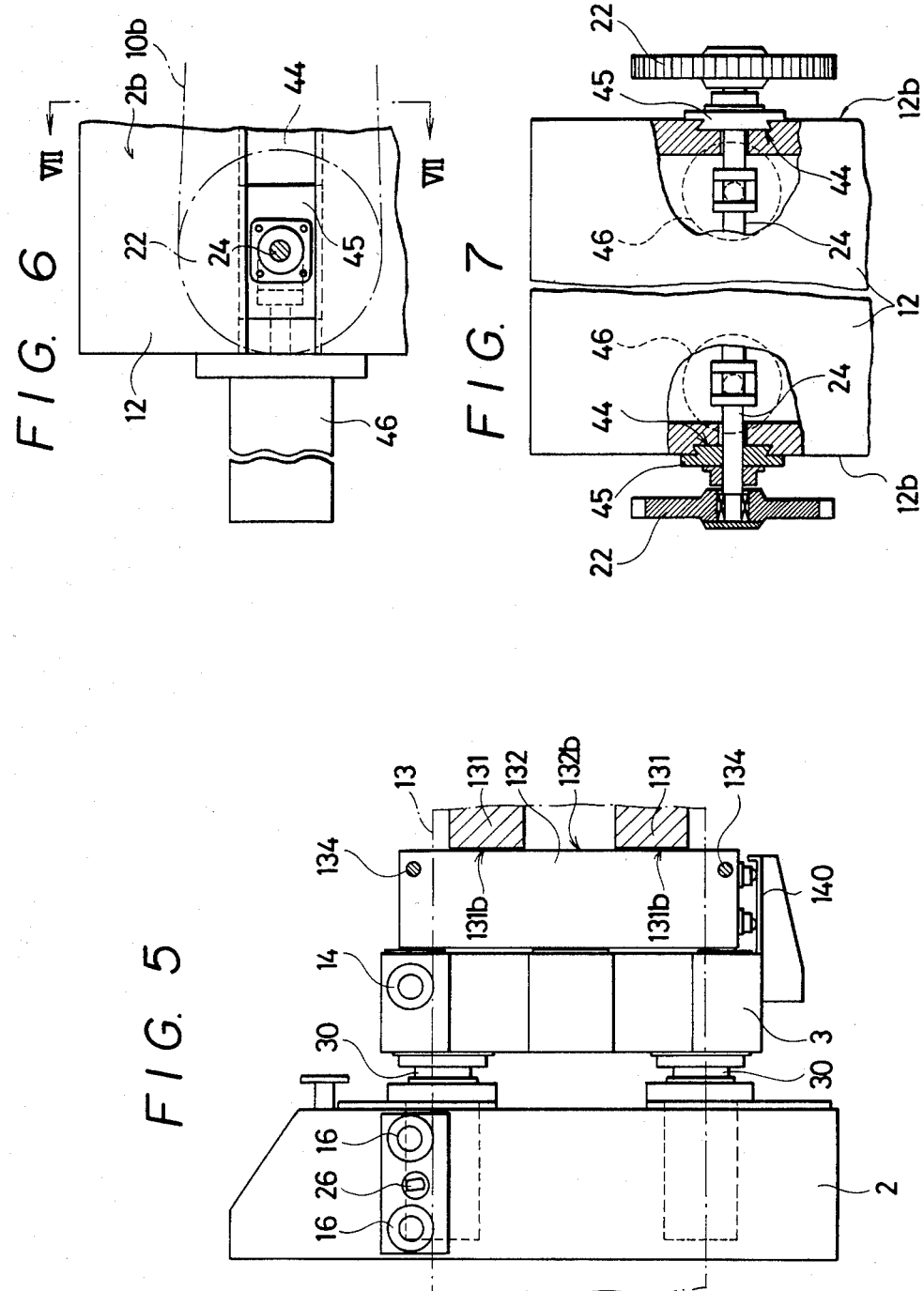

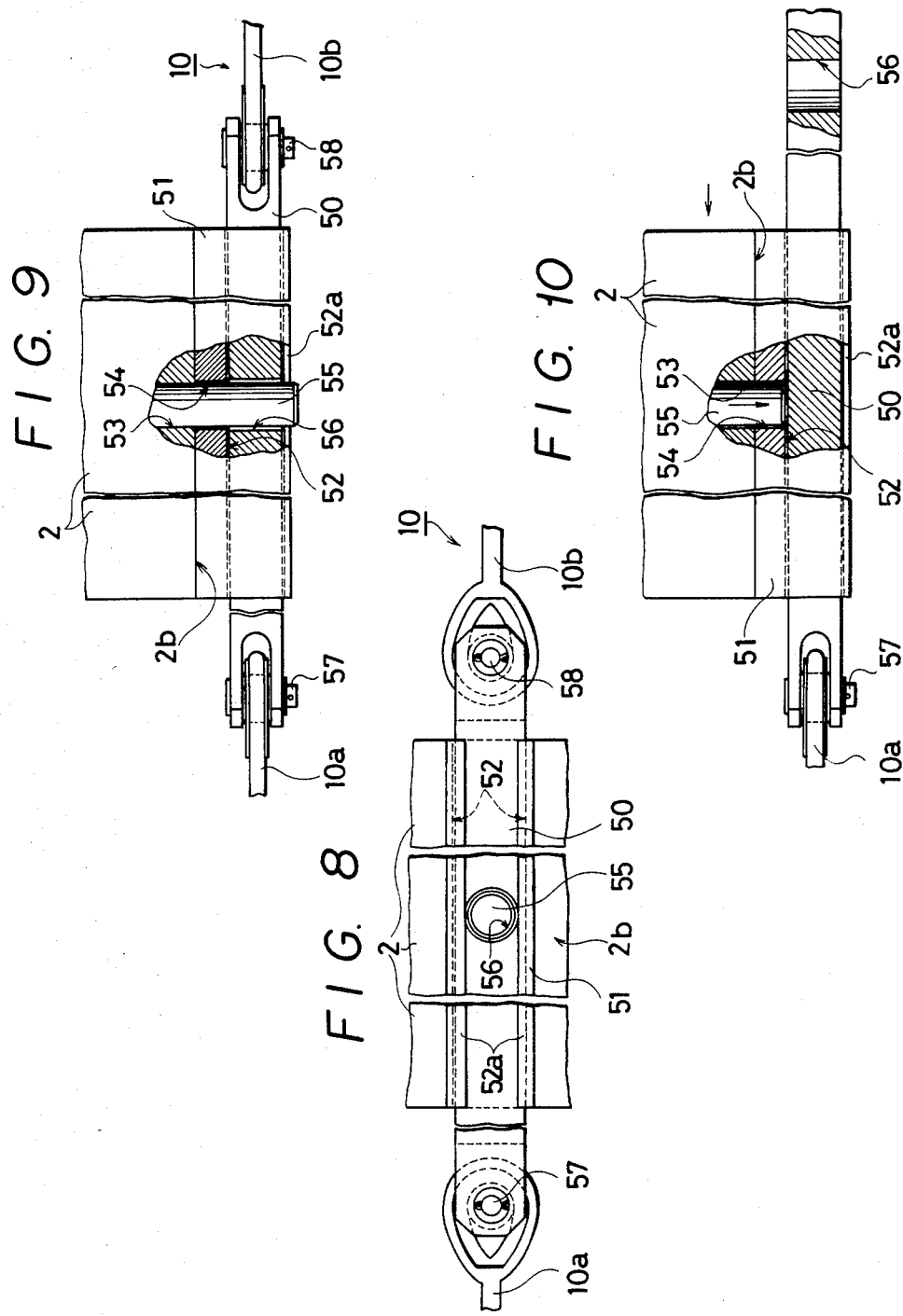

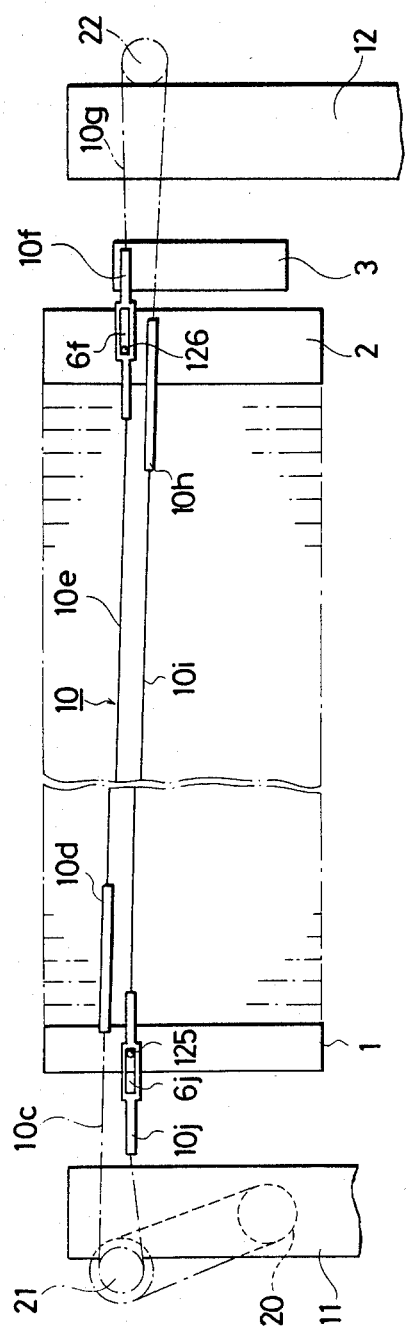
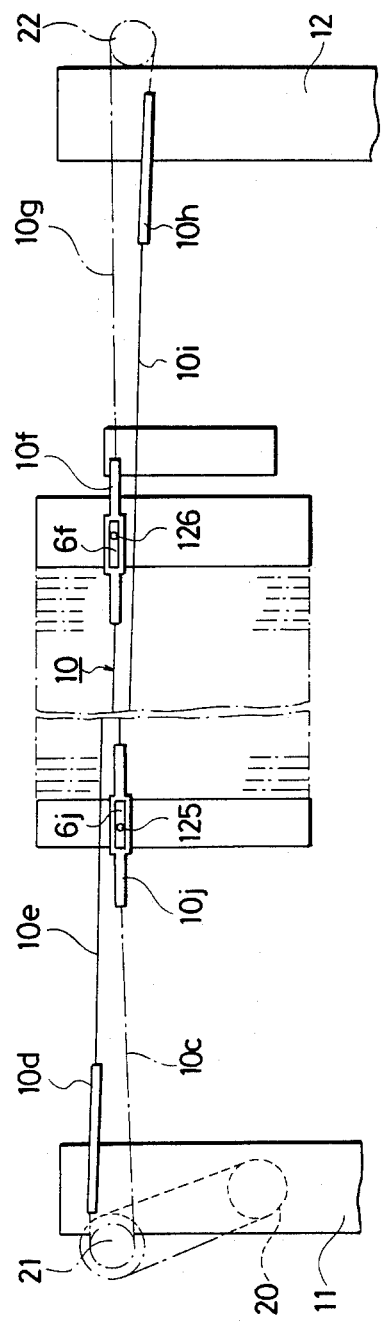
FIG. 11
FIG. 12

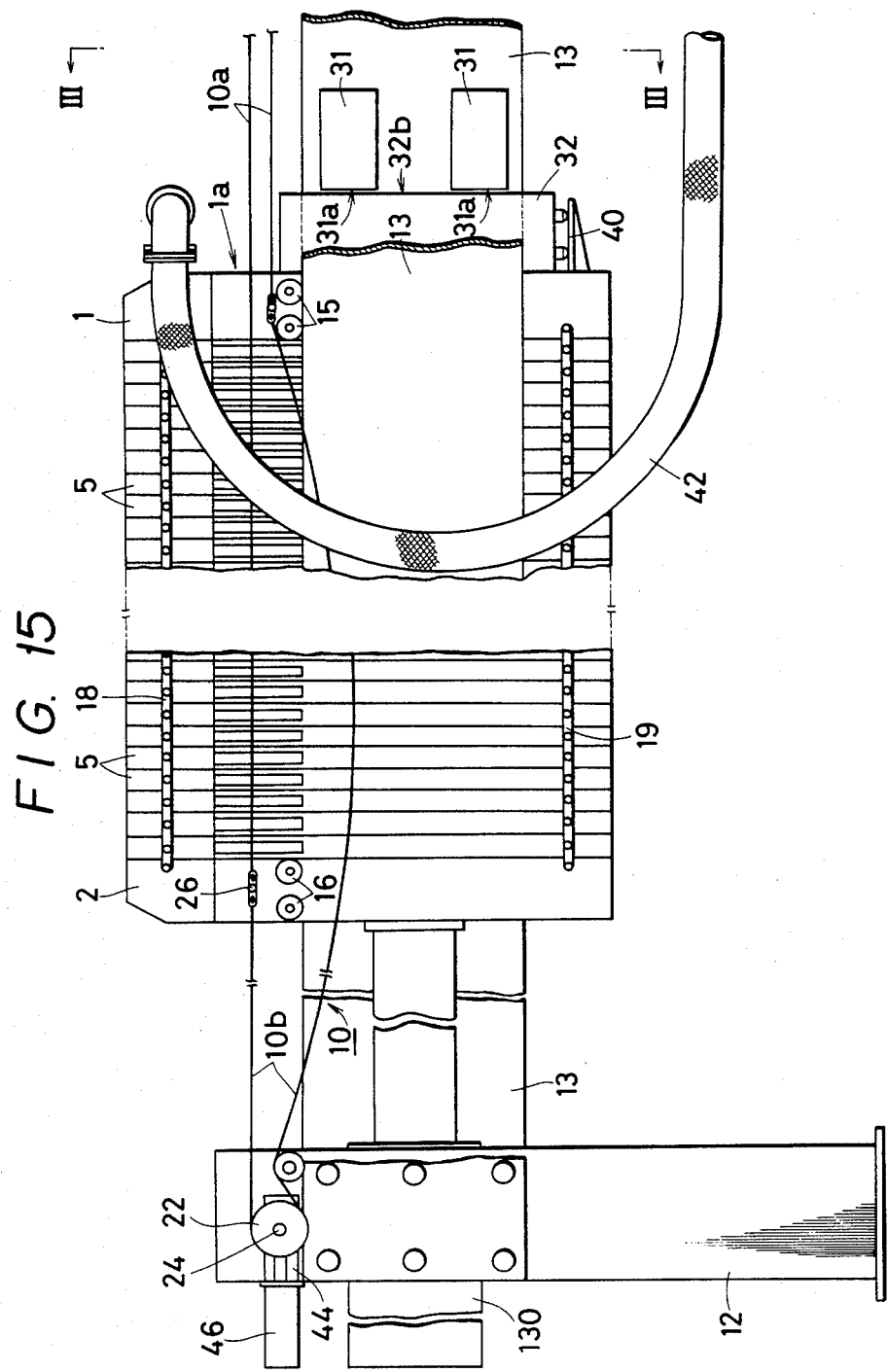

FILTER PRESS OF MOVABLE TWIN HEAD TYPE

BACKGROUND OF THE INVENTION

There has been known to the art a filter press of the type in which a plurality of filter plates are arranged in parallel between a pair of heads and on a pair of parallel guide rails supported by machine frames and in which the individual filter plates are connected one to another by loose link means between the pair of heads so that they may be assembled or separated at same time. The filtering operation is carried out when the filter plates are assembled, and the cake-discharging operation is carried out through movement of filter cloths when the filter plates are separated. Filter presses of such type are disclosed in U.S. Pat. No. 3,807,567, British Pat. No. 1429855, German Pat. No. 2309778, and Canadian Pat. No. 996470, for example.

In any such filter press, liquid to be filtered or slurry is fed under high pressure for filtration when the filter plates, adapted to be folded and unfolded in accordion pattern, are folded or assembled, and if each filter plate has diaphragms provided on its surfaces for pressing the cakes, the diaphragms are subject to pressure. Therefore, it is essential that the individual filter plates arranged between the pair of locking heads must be held in tightly locked condition so as to withstand such high pressure when they are assembled together.

Such filter press also requires that in order to provide a larger filtration area there must be a larger number of filter plates.

Therefore, the following problems have been found with filter presses of such type.

One problem is that increasing the number of filter plates to provide a larger filtration area involves an increased distance of stroke of the piston rod in the hydraulic cylinder means for separating, assembling and tightening the filter plates entrained on the pair of guide rails, such increased distance of stroke requiring much larger space. Another problem is that in order to prevent the piston rod from buckling due to the increased distance of stroke, the piston rod must have its diameter and weight increased at same time, which means considerable increase in costs.

One approach for solving these problems may be that the pair of heads are adapted to be movable and that the hydraulic cylinder is disposed between one of the heads and one of the frames, with ready-to-engage latch means provided between the other head and the other frame or a guide bar, said latch means being adapted to unretreatably hold said other head in position on the guide bar. With a filter press of such arrangement, however, there is a still a problem that, as is the case with a filter press of the type disclosed in U.S. Pat. No. 3,807,567, wherein one of the heads is stationary, that is, fixed to a frame supporting guide bar, and the other head is movable, considerable time is required in assembling or separating all the filter plates because the filter plates are assembled or separated in regular sequence from one end side through the movement of the movable head, and therefore, that the time requirement for assembling and separating the filter plates, or so-called miscellaneous cycle time that is not directly concerned with filtering operation, will increase as the number of filter plates is increased to provide increased filtration area, which will rather result in decreased filtration efficiency. Inasmuch as the means for folding and unfolding the assembly of filter plates in accordion pattern comprise one head for assembling and separating the filter plates over the entire space for the purpose and drive means therefor provided on the head and since means for tightening the filter plates, as assembled, under high pressure comprise a hydraulic cylinder disposed on another head, the above problem is unavoidable, even if the stroke of the hydraulic cylinder could be minimized.

SUMMARY OF THE INVENTION

The present invention is intended to provide a solution to these problems. Accordingly, the primary object of the invention is to provide a filter press which permits improved filtration efficiency due to increased number of filter plates and yet can reduce miscellaneous cycle time required for assembling and separating the filter plates to one half the level as prevalent with the conventional type and which permits the desired increase in the number of filter plates without requiring unreasonably large-sized means for tightening the filter plates as assembled under high pressure. More specifically, the invention contemplates the provision of a filter press having a plurality of filter plates movably arranged on a pair of parallel guide rails supported by machine frames and along the length of the guide rails, a pair of heads 1,2 disposed in such a way that the filter plates are entrained therebetween, each of the filter plates and the heads 1,2 being back and forth movably connected to the adjacent plates by loose connecting means, characterized in:

(i) that said pair of heads 1 and 2 are movably supported on said pair of parallel guide rails and along the length thereof;

(ii) that said pair of heads 1,2 are provided with simultaneous drive means for moving the heads 1 and 2 at same time in such manner that the filter plates, when they are in separated apart state, are moved in a forward or plate-closing direction one after another beginning from those at both ends of the train to close the intervals therebetween, and that the filter plates, when they are in assembled state, are moved in a reverse or plate separating direction one after another beginning from those at both ends of the train to provide intervals therebetween; and (iii) that one of the heads is provided with ready-to-engage latch means for holding the head in its first or forward position and without retreat relative to the guide rails as the filter plates are completely assembled, the other head being provided with locking means for further tightening the filter plates in their assembled condition;

(iv) that said locking means provided on said other head comprises a movable beam 3 which is at least substantially supported on said pair of guide rails and behind the head 2 and connected to the head 2 through loose connecting means so that the interval between the beam 3 and the head 2 may be adjusted, ready-to-engage lach means for holding the movable beam 3 in its forward position and without retreat relative to the guide rails, and hydraulic cylinder means 30 disposed between the head 2 and the movable beam 3.

The above and other related objects and features of the invention will be apparent from the following description and claims taken in connection with the accompanying drawings, forming a part of this application.

BRIEF DESCRIPTION OF THE DRAWINGS

FIG. 5 is a side view showing another head and a movable beam;

FIG. 6 is a side view showing means for relaxing cord-form drive means;

FIG. 7 is a front view thereof (in section taken along line VII—VII in FIG. 6);

FIG. 8 is a side view of connecting means adapted to connect or disconnect the cord-form drive means, as required, relative to the heads;

FIG. 9 is a partially cutaway plan view of same in engaged position;

FIG. 10 is a partially cutaway plan view of same in disengaged position;

FIGS. 11 and 12 are side views showing another form of cord-form drive means;

FIG. 15 is a partially cutaway side elevation of same as seen when the filter plates are assembled together.

DESCRIPTION OF THE PREFERRED EMBODIMENTS

Figure 1:
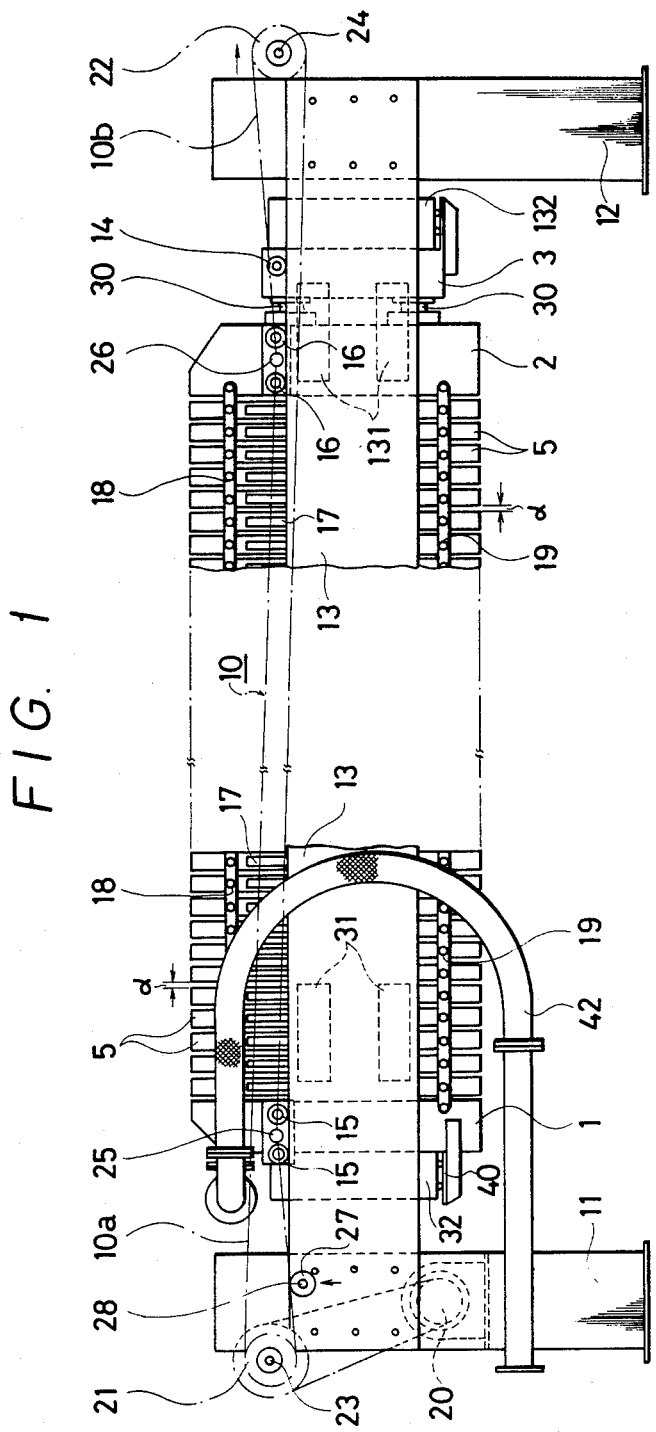
FIG. 1 is a side view of a filter press representing one embodiment of the invention, as seen when the individual filter plates are separated to give definite intervals therebetween.
Figure 2:
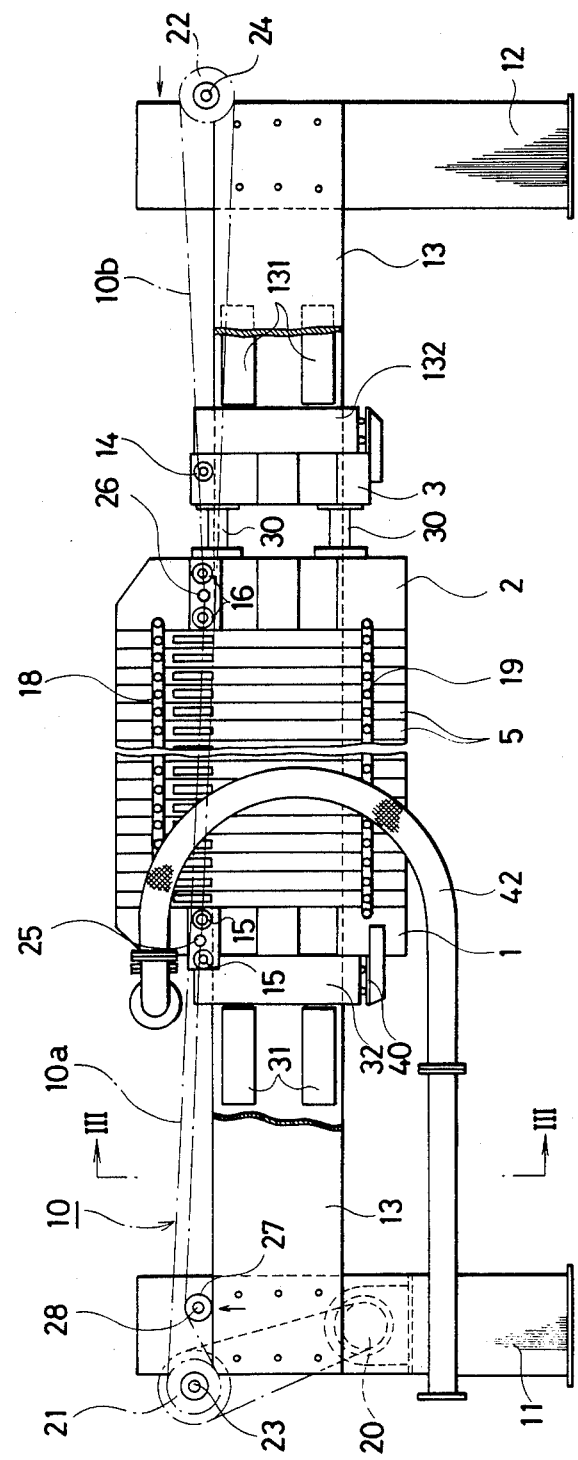
FIG. 2 is a partially cutaway view in side elevation showing the filter press, with its filter plates tightly assembled.
Figure 4:
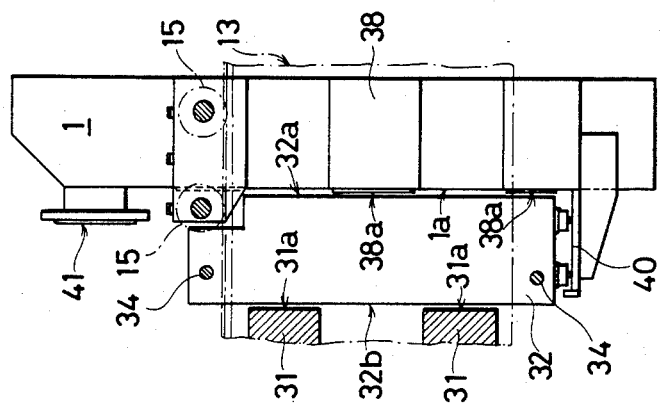
FIG. 4 is a side view thereof (in section taken along line IV—IV in FIG. 3)

Referring to the embodiment of the invention shown in FIGS. 1 through 7, inclusive, there are horizontally supported a pair of parallel guide rails 13,13 by a pair of frames 11,12. Between the guide rails 13,13 there are disposed a pair of heads 1,2 and a plurality of filter plates 5,5 . . . arranged therebetween. The heads 1 and 2 are supported on the guide rails 13,13 through wheels 15,15 . . . and 16,16 . . . respectively so as to be movable in the longitudinal direction of the guide rails 13,13. The filter plates 5,5 . . . , each is supported on the guide rails 13,13, through arms 17 outwardly projecting at both sides thereof, and movable in the longitudinal direction of the guide rails 13,13. The filter plates 5,5 . . . disposed between the pair of heads 1,2 are connected to one another and to the heads through loose connecting means similar to those used in certain known filter presses, for example, links 18,18 . . . and 19,19 . . . having loose connecting holes (elongate holes), such connecting means being back and forth movably provided at both sides of the entrained filter plates 5,5 . . . and at upper and lower locations for each side. Thus, when the filter plates 5,5 . . . arranged between the pair of heads 1,2 are in separated apart condition, with an interval α between each two filter plates, as shown in FIG. 1, if the pair of heads 1,2 are moved toward each other, the intervals α between the individual filter plates 5,5 . . . are closed one after another, first with those at both ends, until the filter plates 5,5 . . . are closely assembled as shown in FIG. 2. Conversely, if the filter plates 5,5 . . . , as they are in assembled condition as shown in FIG. 2, are moved away from one another, the individual filter plates 5,5 . . . are separated to give intervals α therebetween as shown in FIG. 1.

The filter press in the present embodiment has a movable beam 3 disposed behind the head 2 and at least substantially supported on the pair of guide rails. The movable beam 3 may be slidably supported on a support means therefor provided behind the head 2. In the embodiment shown, however, the movable beam 3 is supported on the guide rails 13 by means of wheels 14 and is loosely connected to the head 2 by means of four hydraulic cylinders 30 in such a manner that the interval between the movable beam 3 and the head 2 may be adjusted within certain limits.

Accordingly, if either the movable beam 3 or the head 2 is moved back and forth, the other is caused to move in conjunction therewith through said connecting means.

As mentioned above, the filter press of the invention is so adapted that if the pair of heads 1,2 disposed at both ends of the entrained filter plates are moved forward (i.e., in a plate-closing direction towards one another) or backward (i.e., in a plate-separating direction away from one another) at same time, the filter plates 5,5 . . . are caused to move accordingly in sequential order from both ends until they are assembled or separated. For this purpose, said pair of heads 1,2 are provided with simultaneous drive means for moving the filter plates substantially at same time in forward or backward direction as required.

In the present embodiment, the simultaneous drive means comprise cord-form drive means 10 disposed along and at both sides of the train of heads 1,2 and filter plates 5,5 . . . therebetween and trained in substantially endless pattern over a pair of wheels 21, 22 rotatably supported at suitable locations on the frames 11, 12 (or, maybe, on the guide rails 13,13), connecting means which connect the cord-form drive means, at suitable locations on those portions thereof which are adapted to travel along the length of the guide rails 13, to the heads 1,2, and forward-reverse drive means for the cord-form drive means 10. The cord-form drive means 10 comprise a cord-form drive element 10a connected at one end 25 thereof to the head 1 and at the other end 26 to head 2 and trained over a wheel 21 located behind the head 1, and another cord-form drive element 10b connected at one end 25 to the head 1 and at the other end 26 to the head 2 and trained over wheels 22 located behind the head 2, so that the cord-form drive means 10 is substantially of endless form. Designated by numeral 27 is a tightener roll, the axis of which is constantly urged upward by certain rotatably supporting means not shown.

Said cord-form drive means 10 may be constructed of chain or wipe rope. Alternatively, portions thereof which will wrap around the wheels 21,22 when the pair of heads 1,2 are moved forward or reverse substantially at same time to assemble or separate the filter plates 5,5 . . . may be formed of such flexible material as chain or wire rope, and the remaining portions which will not wrap around the wheels 21,22, that is, straight travelling portions may be formed of some rigid stickform material. In the present embodiment, the cord-form drive means 10 is such that the portions thereof which travel around the wheels 21,22 are formed of chain, the wheels 21,22 being of sprocket wheel type.

The forward and reverse drive means for said substantially endless cord-form drive means 10 comprise an electric motor 20 suitably disposed on the frame 11, and an interlocking mechanism between the motor 20 and a shaft 23 of the wheel 21. If the motor 20 is driven forward or reverse, the heads 1,2 are caused to move accordingly and the movable beam 3 is moved forward or reverse in conjunction with the head 2, so that the filter plates 5,5, . . . are moved to unite together or separate from one another in manner as above described, that is, in sequential order from those at both ends of the train.

Between each two adjacent filter plates there is provided a filter cloth means (not shown) of the type as employed in known recessed-plate type filter presses, for example, one which is adapted to move simultaneously with those similarly disposed between the other filter plates 5,5 . . . to perform such operations as cake discharge and filter cloth cleaning.

Figure 3:
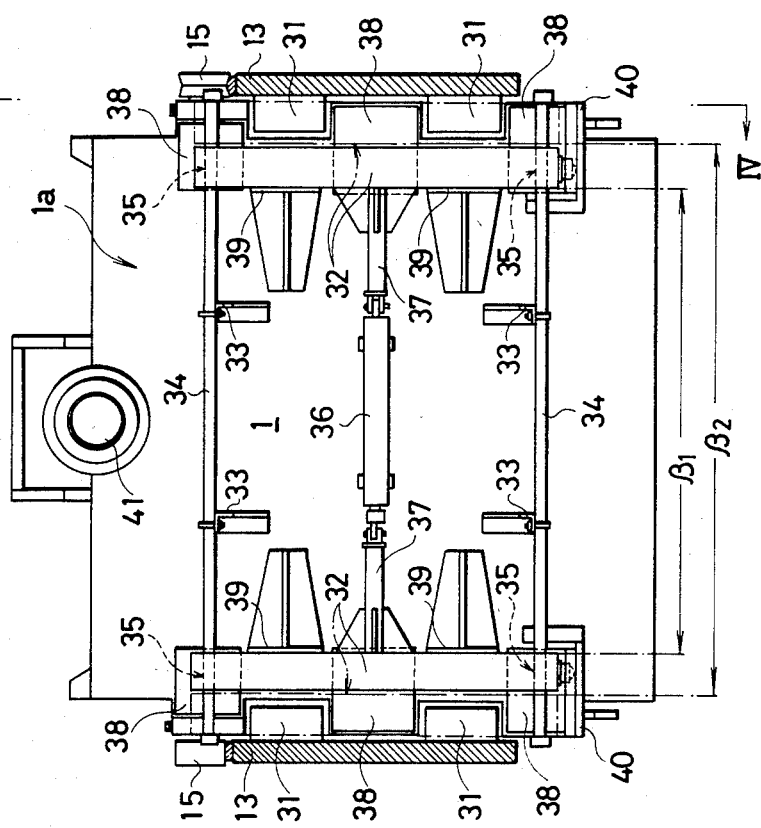
FIG. 3 is a rear elevation of one head (in section taken along line III—III in FIG. 2)

The head 1 in the filter press of the invention is provided with ready-to-engage latch means for unretreatably holding the head 1 in its first or forward position when the filter plates 5,5 . . . are assembled together, or when the head 1 is moved to the forward position by said simultaneous drive means. That is, on the side of the guide rails 13,13 each there are suitably provided two inwardly projecting engagement projections 31,31, upper and lower, adapted to engage a stopper 32 provided on the adjacent side of the head 1. (There are a pair of stoppers 32,32 against two pairs of projections 31,31.31,31, one pair each on the guide rails 13,13.) Said pair of stoppers 32,32 have two pairs of holes 35,35.35,35, upper and lower, through which a pair of parallel bars 34,34 extend, said bars being horizontally supported, through supporting blocks 33,33.33,33, on the rear surface 1a of the head 1 in parallel relation thereto. The pair of stoppers 32,32 are supported by said pair of parallel bars 34,34 through said holes 35,35.35,35 and adapted to be moved toward and away from the guide rails 13,13. The stoppers 32,32 are connected to each other through a hydraulic cylinder 36 supported on the rear surface 1a of the head 1 and brackets 37,37, each connected to one end of the hydraulic cylinder 36. If the hydraulic cylinder 36 is contracted, the interval between the stoppers 32,32 is reduced to hold the stoppers 32,32 in the position indicated by solid line in FIG. 3. If the hydraulic cylinder 36 is stretched, the stoppers 32,32 are moved outwardly until they substantially abut the side faces of the guide rails 13,13 as illustrated by chain line in FIG. 3, so that the head 1 is securely held in its forward position as reached when the intervals between the filter plates 5,5 . . . are closed. When the stoppers 32,32 are kept in their retreated position, a position at which they have a reduced interval $\beta_1$ therebetween as shown in FIG. 3, the head 1 is allowed to advance. If the stoppers 32,32 are brought to their forward position (indicated by chain line in FIG. 3), a position at which they have an increased interval $\beta_2$ therebetween, when the filter plates 5,5 . . . are assembled together, their respective rear surfaces 32b are brought in engagement with said projections 31,31 . . . , and concurrently their respective front surfaces 32a are brought in engagement with the rear surfaces 38a,38a. . . of projections 38,38,38.38,38,38 provided on the head 1 at both sides thereof. Thus, the head 1 is unretreatably held in its forward position as reached when the filter plates 5,5 . . . are assembled together. Needless to say, this latch engagement is released when the stoppers 32,32 are retreated until the interval therebetween is reduced to $\beta_1$ (indicated by solid line in FIG. 3).

In FIG. 3, numerals 38,39 designate arresting plates for holding the stoppers 32,32 in a fixed retreat position, numeral 40 designates a backing plate for carrying the weight of stopper 32, and numeral 41 designates a passage for slurry. In FIGS. 1 and 2, numeral 42 is a slurry feed pipe.

In the filter press of the present invention, the movable beam 3 is provided with ready-to-engage latch means adapted to cooperate with the head 2, as the interval between the beam 3 and the head 2 is reduced, to unretreatably hold the beam 3 in forward position when the head 2 is brought to that position by the simultaneous drive means, or when the filter plates are assembled together. Said latch means for the movable beam 3 may be constructed similarly to the latch means for the head 1.

Referring to FIGS. 1,2 and 5, numeral 131 is an engagement projection similar to said projection 31, and numeral 132 is a stopper similar to said stopper 32. As FIG. 2 shows, the movable bean 3 can be held in the forward position without retreat if a pair of stoppers 132,132 provided on the rear surface of the beam 3 are brought in engagement with the projections 131,131.131,131 on the guide rails 13,13.

The filter press of the present invention has locking means adapted to act on the head 2 and movable beam 3 brought to the forward position after the filter plates 5,5 . . . are assembled by the simultaneous drive means for the heads 1,2 and after the head 1 and movable beam 3 are unretreatably held in the forward position by means of said stoppers 132,132. By the action of the locking means the head 2 is moved forward further and thus the assembled filter plates 5,5 . . . are further tightened. In the filter press of the invention, the locking means is represented by said hydraulic cylinder 30 disposed between the head 2 and the movable beam 3. In other words, this hydraulic cylinder has dual functions: it acts as locking means and concurrently as loose connecting means for connecting the movable beam 3 to the head 2. Therefore, in order to make it possible that, after the filter plates 5,5 . . . are assembled by the action of the simultaneous drive means for the heads 1,2 and after the head 1 is unretreatably held in the forward position, the head 2 which is interlockingly connected to the head 1 through the cord-form drive means 10, a major component of the simultaneous drive means, be moved forward further by the stretch motion of the hydraulic cylinder 30, there are provided means for relaxing the cord-form drive means in the simultaneous drive means. Referring to FIGS. 6 and 7, the means for relaxing the cord-form drive means in the embodiment comprise bearing means displaceably supporting the shaft 24 of the wheels 22 disposed behind the head 2 in the direction of movement of the head 2 and displacement control means adapted to displace the shaft 24 between two desired positions. The wheels 22,22 in pair are rotatably supported on the shaft 24 at both ends thereof, said shaft 24 extending through sliding blocks 45,45 which are back and forth slidable along dovetail grooves 44,44 formed on the sides 12b,12b of the frame 12. The pair of wheels 22,22 can be controlled to any selected forward or backward position by displacing the shaft 24 in the direction of movement of the frame 2 by means of hydraulic cylinders 46,46 connected to the shaft 24. Therefore, when the pair of wheels 22,22 are controlled to their backward position (FIG. 1), the cord-form drive means 10 may be kept under tension to actuate the pair of heads 1,2 to move forward or backward almost at same time so that the filter plates 5,5 . . . may be assembled or separated at same time. After the filter plates 5,5 . . . have thus been assembled, with the stoppers 32,32 caused to act on the head 1, if the pair of wheels 22,22 are controlled to their forward positions (FIG. 2), that portion of the cord-form drive element 10b which is trained over the wheel 22 is relaxed, and thus the hydraulic cylinders 30 may be further stretched within the limit up to which the so relaxed cord-form drive element 10b permits the advance of the head to. When the head 2 is moved forward by such stretching motion of the hydraulic cylinder 30, the filter plates 5,5, . . . in assembled state are further tightened between the head 2 and the head 1 which is securely held by the stoppers 32 against retreating.

Operation will now be explained. In the filter press of the present invention, the heads 1,2 for folding and unfolding the filter plates 5,5 . . . arranged between them in accordion pattern are supported on guide rails 13 back and forth movably relative to each other and they are connected to each other by simultaneous drive means so that the individual filter plates 5,5 . . . may be moved forward or backward almost simultaneously in such manner that when they are in separated apart state they will be moved forward one after another from the both end sides to close the intervals therebetween and that when they are in assembled state they will be moved backward one after another from the both end sides to provide intervals therebetween. Therefore, if the simultaneous drive means are actuated, or more specifically, where the filter plates 5,5 . . . are in separated apart state as shown in FIG. 1, if the electric motor 20 is driven forward after the wheels 22,22 are controlled to their backward position to keep the cord-form drive means under tension, the heads 1 and 2 are moved forward at same time and accordingly the intervals between the individual filter plates 5,5 . . . are closed in sequential order from the both end sides in such manner that the left and right half groups of filter plates 5,5 . . . in FIG. 1 are moved toward the center almost simultaneously from both end sides, the intervals between the individual filter plates 5,5 . . . being thus closed (FIG. 2).

Conversely, when the filter plates 5,5 . . . are in assembled state, if the motor 20 is driven reverse, the heads 1 and 2 are moved backward at same time and accordingly the filter plates 5,5 . . . are separated one after another from both end sides. That is, the left and right half groups of filter plates in FIG. 2 are deployed almost simultaneously in the leftward and rightward directions so that intervals are provided between the individual filter plates 5,5 . . . (FIG. 1).

With the filter press of the invention arranged as such, the time requirement for assembling and separating the filter plates 5,5 . . . is reduced to about one half of that in the case of filter presses of conventional type in which only one of the heads is moved forward and backward to assemble and separate the filter plates, with the other head fixedly mounted or held stationary.

Moreover, in the filter press of this invention, behind the head 2 there is provided a movable beam 3 loosely connected thereto, both being connected by the hydraulic cylinder 30; therefore, if the cylinder 30 is kept in contracted condition, the interval between the head 2 and the movable beam 3 is kept to minimum so that the movable beam 3 is allowed to move in conjunction with the head 2.

Furthermore, the present invention is such that the head 1 and the movable beam 3 connected to the rear side of the head 2 are both provided with ready-to-engage latch means which are adapted to unretractably hold the head 1 and the movable beam 3 in position when the filter plates 5,5 . . . are in assembled state. Therefore, by causing these latch means, or stoppers 32 and 132 in the present instance, to act on the head 1 and the movable beam 3 respectively to unretreatably hold them in their respective forward positions relative to the guide rails 13 and thereafter by subjecting the head 2 to the action of the locking means for further tightening the assembled filter plates 5,5 . . . is it possible to advance the head 2 further as earlier described. In the present invention, wherein there is provided a cord-form drive means 10 which is connected to the head 2, there is also provided a relaxing means for relaxing the cord-form drive means 10 in order to permit such further tightening. So, if the hydraulic cylinder 30 is stretched to advance the head 2, as the cord-form drive means 10 is relaxed, the filter plates 5,5 assembled between the heads 1 and 2 are vigorously tightened to allow the slurry to be fed into the train of filter plates under pressure for filtering operation and further to permit high-pressure compression by means of diaphragms or the like of cakes produced within the filter plates during the filtering operation. In the filter press of the invention, a high-pressure cylinder having a very short stroke is employed for such further tightening operation.

Next, another embodiment of the invention will be explained. In the above described embodiment, the simultaneous drive means mounted to a pair of heads 1,2 include cord-form drive means 10 connected solidly to the heads 1 and 2 at 25 and 26 respectively, and therefore, in order to allow one of the heads, i.e. head 2, to advance further toward the other head 1 unretreatably held in its forward position, the cord-form drive means 10 is provided with relaxing means therefor. In another embodiment, of the connections which connect to the heads 1,2 that portion of the cord-form drive means which is trained over the wheel disposed behind the head 2, at least one connection relative to one of the heads 1,2 is connected to said one head 1 or 2 through ready-to-engage connecting means. Referring to FIGS. 8 through 10 in which the embodiment is shown, the connection 26 is disengageable. A portion of the cord-form drive means 10 comprises a rod element 50. On the outer side face of side wall 2b of the head 2 there is mounted a guide block 51 having a groove 52 with a lip 52a. The rod element 50 is slidably supported by the groove 52 of the guide block 51 in the direction of the guide block 51 in the direction of movement of the head 2 (left and right direction in the drawings) and relative to the head 2. At a suitable location on the guide block 51 and the side wall 2b of the head 2 there are bored holes 53 and 54 extending therethrough. In the holes 53,54 there is slidably fitted a stopper pin 55, the front end of which is retractably extensible through the hole 54 into the groove 52 of the guide block 51. The rod element 50, in a portion thereof adjacent the right end in FIGS. 8-10, has an engaging hole 56 formed which permits entry of the stopper pin 55 thereinto for engagement. If the stopper pin 55 engages the engaging hole 56, the cord-form drive means 10 and the head 2 are interlockingly connected, and if the stopper pin 55 is withdrawn from the engaging hole 56, the head 2 is separated from the cord-form drive means and allowed to move independently.

In order to control the engagement and disengagement of the stopper pin 55 with and from the engaging hole 56, the base of the stopper pin 55 may be connected to a two-position stabilized type solenoid (not shown). Alternatively, two stopper pins 55,55 (stopper pins are required in pair, i.e., one each on both side walls 2b,2b, which remark is also applicable to the relevant description above) may be connected to each other by means of a single-acting hydraulic cylinder with springs urging toward the direction of stretching. Then, it is possible to control the stopper pins for movement between the engagement position shown in FIG. 9 and the disengagement position shown in FIG. 10, thereby connecting and disconnecting the head 2 and the rod element 50 of the cord-form drive means relative to each other.

In FIGS. 8 through 10, numerals 57 and 58 are connections between the cord-form drive elements 10a, 10b and the rod element 50. As may be readily seen from the drawings, with arrangement such that the cord-form drive means 10 and the head 2 can be connected to and disconnected from each other by said ready-to-engage connecting means, the heads 1,2 are moved forward or backward almost at same time to assemble or separate the filter plates 5,5 . . . in sequential order from both end sides when the head 2 and the cord-form drive means 10 are connected relative to each other through the connecting means; and if the connection between the head 2 and the cord-form drive means 10 through the connecting means is removed when the intervals between the individual filter plates are closed, the hydraulic cylinder 30 is stretched to permit further advance of the head 2 so that the filter plates in assembled condition are further tightened.

Figure 13:
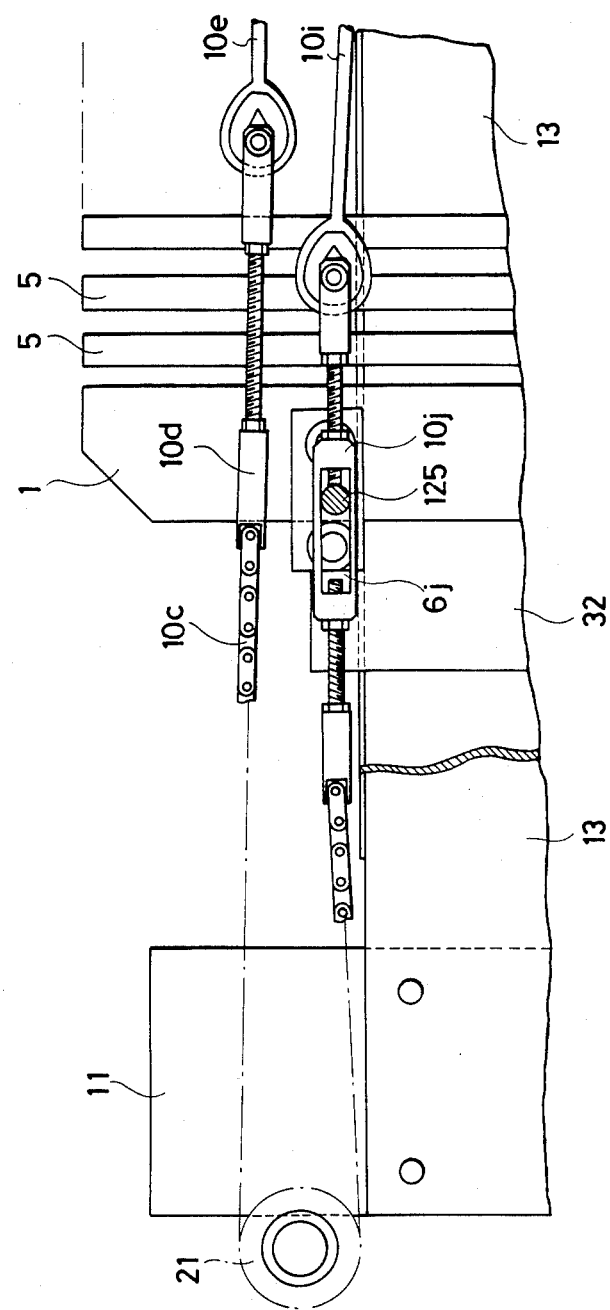
FIG. 13 is a partly enlarged view of same.
Figure 14:
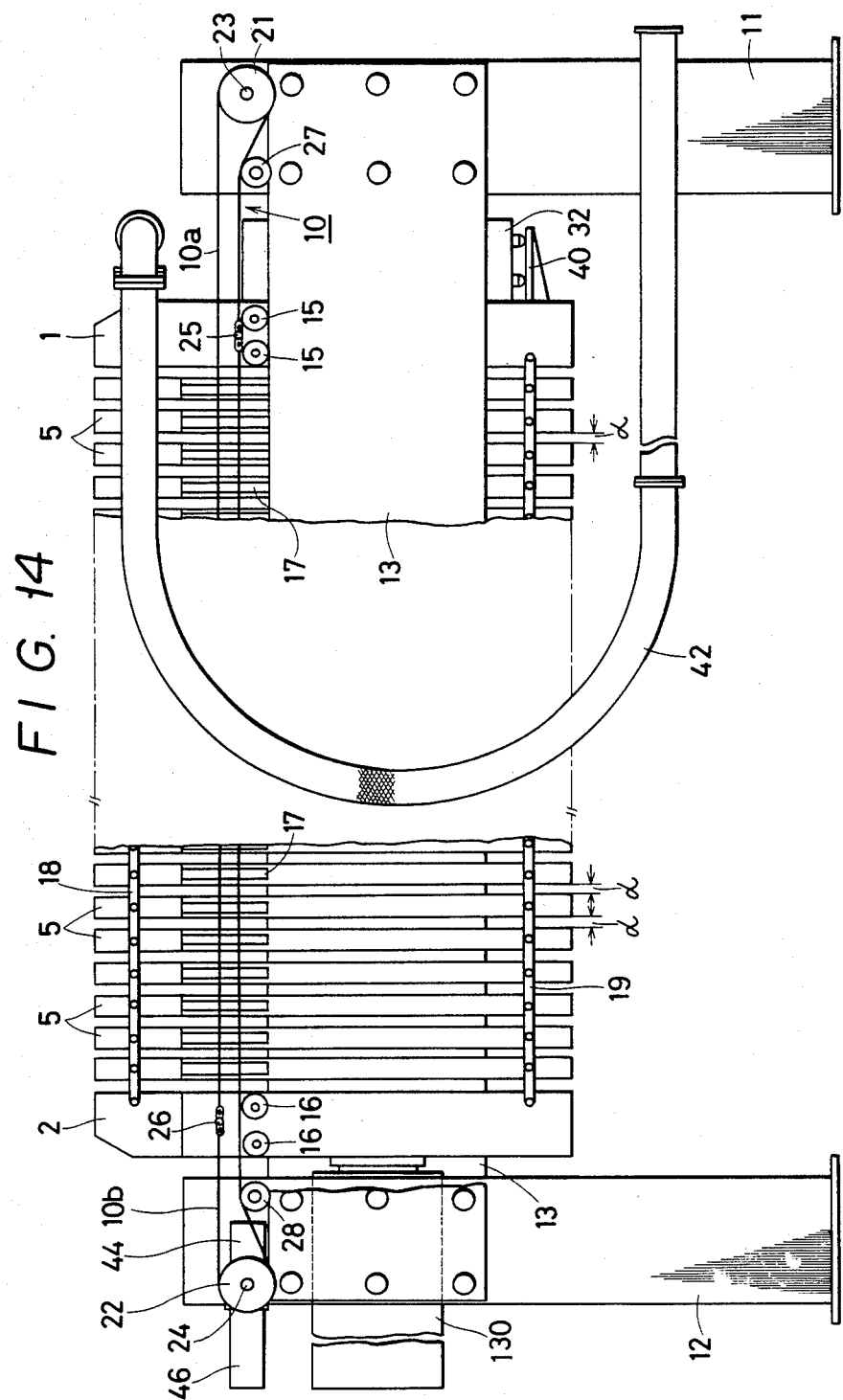
FIG. 14 is a side view of a filter press representing another embodiment of the invention.

In still another embodiment of the invention, simultaneous drive means for the heads 1 and 2 may be constructed as follows. Referring to FIGS. 11 to 13, the cord-form drive means 10 comprise chains 10c,10g which correspond to the portions trained over the wheels 21,22 wheels 21,22 in the form of sprocket wheels, and wire ropes 10e,10i which correspond to portions between said chains 10c and 10g, said pair of chains 10c,10g and said pair of wire ropes 10e,10i being connected by means of stick-like connecting blocks 10d,10f,10h,10j to form an endless assembly. The cord-form drive means 10 in this embodiment are loosely connected at the connecting block 10j to the head 1 and loosely connected at the connecting block 10f to the head 2. The connecting blocks 10j and 10f have elongate openings 6j and 6f respectively. The head 1 is connected to the connecting block 10j through a pin 125 which engages the elongate opening 6j, with a loose stroke within which the pin 125 is loosely movable in the elongate opening 6j; and the head 2 is connected to the connecting block 10f through a pin 126 which engages the elongate opening 6f, with a loose stroke within which the pin 126 is loosely movable in the elongate opening 6f. Thus, the relation between the heads 1 and 2 is such that when the heads 1,2 are remotest from each other as in FIG. 11, if the cord-form drive means are driven counterclockwise, the pin 125 engages the left end of the elongate opening 6j and the pin 126 engages the right end of the elongate opening 6f, so that the heads 1,2 are moved forward until the closed condition as in FIG. 12 is reached. When this closed condition is present, if the stoppers 32,132 are caused to act on the head 1 and movable beam 3 respectively (not shown in FIGS. 11 and 12 so that the head 1 and movable beam 3 are prevented from retreating, and thereafter if the hydraulic cylinder 30 (not shown in FIGS. 11 and 12) is stretched to move the head 2 away from the movable beam 3 and thus to effect increased tightening, the pin 126 moves within the elongate opening 6f in the left direction in FIG. 12 to permit such increased tightening.

In the above embodiment, the heads 1 and 2 are loosely connected at pins 125 and 126 to the cord-form drive means 10. Alternatively, only the pin 126 at the head 2 adjacent the movable beam 3 may be loosely connected in manner as above described.

In the embodiments described above, the simultaneous drive means are connected to the heads 1 and 2 to move them almost simultaneously in the forward direction, a direction for closing the intervals between the filter plates sequentially from both end sides and in the reverse direction, a direction for separating the filter plates in assembled condition sequentially from both end sides. Since the head 2 and the movable beam 3 are moved in conjunction with each other during such forward and reverse movement, the simultaneous drive means may be connected to the head 1 and the movable beam 3, instead of the heads 1,2 so that the heads 1,2 may be indirectly moved at same time (not shown). In that case, relaxing means of the cord-form drive means 40 for allowing increased tightening by the head 2, ready-to-engage connecting means including pins 55 and holes 56, and loose connecting means comprising elongate holes 6f and pins 126 are not required.

Having now described some preferred embodiments of the invention, the filter press in accordance with the invention, as earlier stated, has a pair of heads 1,2 movably supported on a pair of guide rails and along the length thereof in same manner as the filter plates 5,5 . . . arranged in multiplicity therebetween, the heads 1,2 and filter plates 5,5 . . . being back and forth movably connected through loose connecting means. The pair of heads 1,2 are provided with simultaneous drive means for moving them almost simultaneously at least in the forward direction for closing the intervals between the filter plates sequentially from both end sides and in the reverse direction for separating the filter plates sequentially from both end sides to provide intervals therebetween. When they are to be assembled, the filter plates may be moved simultaneously toward the center from both end sides, and when they are to be separated, the plates may be moved simultaneously away from the center from both end sides. Therefore, the time requirement for such assembling and separating operation is reduced to about one half of that required with conventional filter press, if the length of the train of filter plates is same. It follows that some two times as long a train of filter plates as that of conventional filter press can be assembled and separated within same time requirement. With the filter press of the present invention, therefore, miscellaneous cycle time involved in filter-plate assembling and separating can be so much decreased and thus filtration efficiency can be relatively improved.

Furthermore, in the filter press of the invention, it is so arranged that the filter plates are assembled when the heads 1,2 are moved a predetermined distance toward each other, and the means for tightening the filter plates at assembled state under high pressure comprise ready-to-engage latch means for unretreatably holding one of the heads (head 1) in its forward position, a movable beam 3 disposed behind the other head 2 and connected to the head 2 through loose connecting means, with distance therebetween adjustable within a certain range, ready-to-engage latch means for unretreatably holding the movable beam 3 in its forward position, and locking means disposed between the movable beam 3 and the head 2, the stroke of said locking means can be reduced by the length of stroke with which the heads 1,2 are moved forward and reverse, as compared with the tightening stroke of filter presses of conventional type in which assembling and separating operation is carried out by moving only one of the heads forward and backward by tightening means for the filter plates. In accordance with the present invention, the stroke of the high pressure locking means can be considerably reduced as compared with the conventional type. Therefore, the arrangement of the invention permits efficient tightening of many filter plates by use of low-cost locking means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A filter press of movable twin head type having a plurality of filter plates movably arranged on a pair of parallel guide rails supported by machine frames, a pair of heads, including a one head and an other head, (1, 2) disposed in such a way that the filter plates are entrained therebetween, the filter plates and the heads (1, 2) being movably connected by loose connecting means so that the filter plates may be separated to give definite intervals therebetween or assembled to close the intervals and so that the heads each may be separated from or brought close to an adjacent filter plate, characterized in;

(i) that said pair of heads (1, 2) are movably supported on said pair of parallel guide rails;

(ii) that said pair of heads (1, 2) are connected by simultaneous drive means for moving the heads (1, 2) in such manner that the filter plates are moved in a predetermined forward, plate-closing direction one after another beginning from those nearest to the heads to close the intervals between the filter plates, and that the filter plates are moved in a reverse, plate-separating direction one after another beginning from those nearest to the heads to provide intervals between the filter plates;

(iii) that said one head is provided with ready-to-engage latch means for holding said one head in a predetermined forward position and without retreat relative to the guide rails as the filter plates are completely assembled, the other head being provided with locking means for further tightening the filter plates in their assembled condition; and (iv) that said locking means provided with said other head comprises a movable beam (3) which is movably supported on said pair of guide rails for movement therealong and which is behind said other head and connected to said other head through loose connecting means including hydraulic cylinder means (30) disposed between and connected to said other head and the movable beam (3) so that an interval between the beam (3) and said other head may be adjusted, and ready-to-engage latch means for holding the movable beam (3) in its forward position and without retreat relative to the guide rails.

2. A filter press of movable twin head type as set forth in claim 1, wherein said simultaneous drive means for moving the heads (1, 2) comprise cord-form drive means disposed along and on both sides of an entire train including the filter plates and the heads (1, 2), and the movable beam (3), and trained in a substantially endless pattern over a pair of wheels rotatably supported at suitable locations on the frames or guide rails, connecting means for connecting the cord-form drive means at one suitable location to said one head (1) and at another suitable location to the movable beam (3) so that said one head (1) and the movable beam (3) may move in opposite directions from each other along the guide rails, and forward-reverse drive means connected to one of said wheels for forwarding and reversing the cord-form drive means.

3. A filter press of movable twin head type as set forth in claim 2, wherein said cord-form drive means comprises a cord-form drive element connected at one portion thereof to said one head (1) and at another portion thereof to the movable beam (3) and trained over a wheel located behind said one head (1), and another cord-form drive element connected at one portion thereof to said one head (1) and at another portion thereof to the movable beam (3) and trained over a wheel located behind said other head (2), said cord-form drive means being thus substantially of endless form.

4. A filter press of movable twin head type as set forth in claim 2, wherein said forward-reverse drive means for the cord-form drive means is a reversible motor interlockingly connected to one of said pair of wheels.

5. A filter press of movable twin head type as set forth in claim 1, wherein said simultaneous drive means for moving the heads (1, 2) comprise cord-form drive means disposed along and on both sides of an entire train including the filter plates and the heads (1, 2), and the movable beam (3), and trained in a substantially endless pattern over a pair of wheels rotatably supported at suitable locations on the frames or guide rails, connecting means for connecting the cord-form drive means at one suitable location to said one head (1) and at another suitable location to said other head (2) so that said one head (1) and said other head (2) may move in opposite directions from each other along the guide rails, and forward-reverse drive means connected to one of said wheels for forwarding and reversing the cord-form drive means.

6. A filter press of movable twin head type as set forth in claim 5, wherein said cord-form drive means comprises a cord-form drive element connected at one portion thereof to said one head (1) and at another portion thereof to said other head (2) and trained over a wheel located behind said one head (1), and another cord-form drive element connected at one portion thereof to said one head (1) and at another portion thereof to said other head (2) and trained over a wheel located behind said other head (2), said cord-form drive means being thus substantially of endless form.

7. A filter press of movable twin head type as set forth in claim 6, wherein means for connecting said cord-form drive elements to the heads (1, 2) comprise snap means for securing and connecting the cord-form drive elements suitably to the heads and wherein the cord-form drive element trained over the wheel located behind said other head (2) is provided with relaxing means for allowing said other head (2) to be moved forward.

8. A filter press of movable twin head type as set forth in claim 7, wherein said relaxing means for the cord-form drive element comprises bearing means displaceably supporting a shaft of the wheel disposed behind said other head (2) in each direction of movement of said other head (2), and displacement control means for displacing said bearing means between two desired positions.

9. A filter press of movable twin head type as set forth in claim 1, wherein said latch means with said one head (1) comprises projections suitably provided on respective side surfaces of said pair of guide rails, a pair of movable stoppers back and forth movably provided at suitable locations on said one head (1) in orthogonal relation to the respective side surfaces of the guide rails, and means for actuating the pair of stoppers to move back and forth.

10. A filter press of movable twin head type as set forth in claim 1, wherein said latch means for the movable beam (3) comprises projections suitably provided on respective side surfaces of said pair of guide rails, a pair of movable stoppers suitably provided on said movable beam (3) and back and forth movable in orthogonal relation to the respective side surfaces of said guide rails, and means for actuating said pair of movable stoppers.

* * * * *